Dec. 13, 1932.    F. W. PARSONS, SR    1,890,914
ENGINE
Filed Sept. 12, 1929
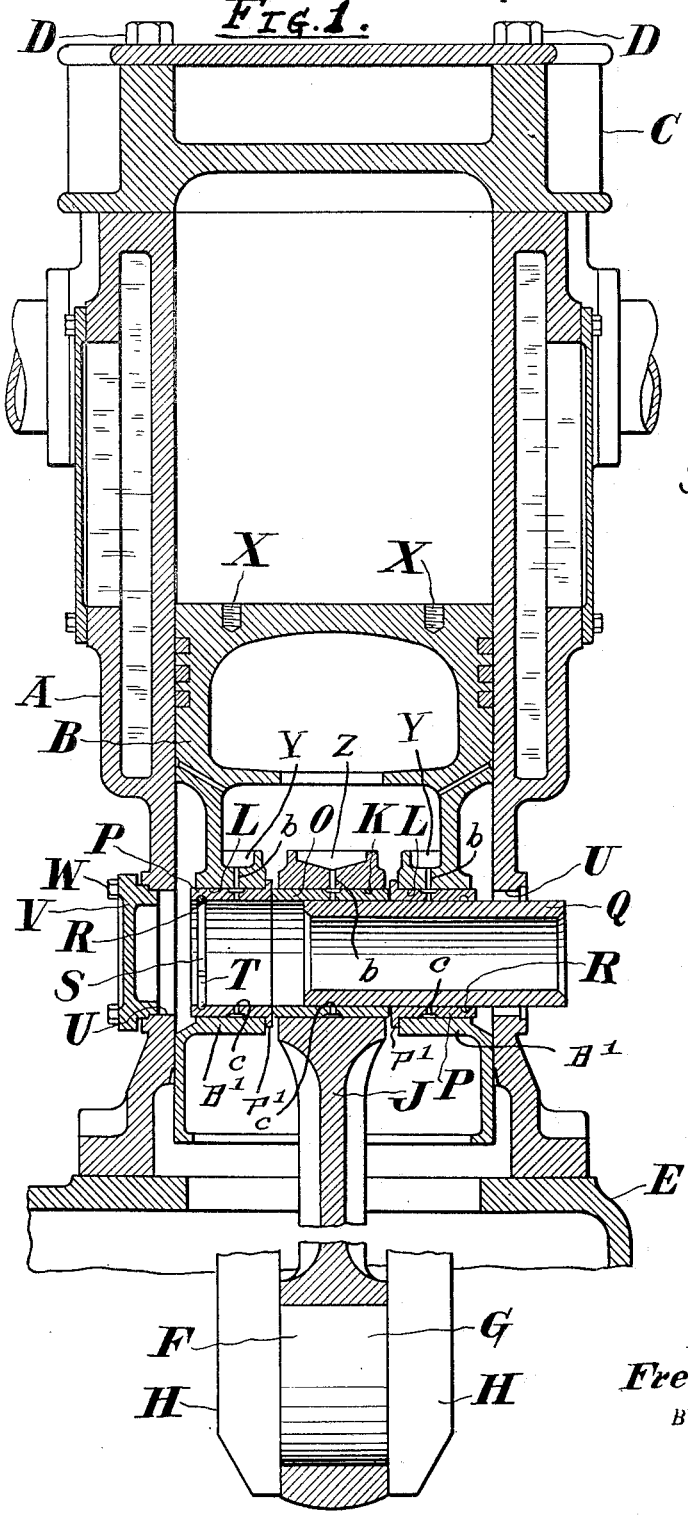
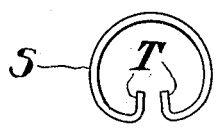
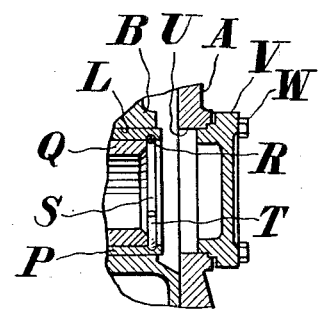
INVENTOR.
Frederick W. Parsons Sr.
BY
HIS ATTORNEY.

Patented Dec. 13, 1932                                      1,890,914

UNITED STATES PATENT OFFICE

FREDERICK W. PARSONS, SR., OF CORNING, NEW YORK, ASSIGNOR TO INGERSOLL-RAND COMPANY, OF JERSEY CITY, NEW JERSEY, A CORPORATION OF NEW JERSEY

ENGINE

Application filed September 12, 1929. Serial No. 392,034.

This invention relates to engines, but more particularly to improvements in the cylinder and the piston of machines of this type.

One object of the invention is to permit of ready accessibility to the wrist pin whereby the piston is connected to the connecting rod without necessitating the removal of the connecting rod from the crank shaft.

Another object is to conveniently retain the wrist pin within the piston.

Other objects will be in part obvious and in part pointed out hereinafter.

In the drawing illustrating the invention and in which similar reference characters refer to similar parts, Figure 1 is a sectional elevation of a compressor cylinder and its piston having the invention applied thereto, Figure 2 is a sectional elevation of a detail, and Figure 3 is an elevation of a spring ring adapted to form an abutment for the end of the wrist pin.

Referring more particularly to the drawing, A designates a cylinder of an engine and B a piston reciprocable therein. The cylinder A is provided with the usual head C which may be secured to the cylinder by means of bolts D and is supported by a base or crank case E wherein is disposed a crank shaft F only a crank G and the webs H of which are shown. The piston B is provided with inner annular bosses B' having bores L therethrough extending transversely of the axis of the piston.

Connected to the crank G of the crank shaft F is a connecting rod J having a bore K in its opposite end adapted to coincide with the bores L in the piston B, and in the bores K and L are disposed bushings O and P respectively to provide renewable wearing surfaces for a wrist pin Q which connects the rod J to the piston B. The bushing O preferably projects on either side of the rod J and the bushings P are provided with heads P' against which the bushing O abuts.

Preferably the combined lengths of the bushings O and P exceed somewhat that of the wrist pin Q, and near the outer ends of the bushings P are internal grooves R for the reception of spring rings S, a portion of which lies within the bores of the bushings P to form abutments for the ends of the wrist pin Q. The spring rings may be provided with introverted ends T which may be conveniently grasped for compressing the spring rings.

In order to eliminate the necessity of disturbing the connection between the connecting rod and the crank shaft whenever it is desired to remove the piston, the cylinder A is provided with apertures U through which access may be had to the wrist pin Q. The apertures U are diametrically opposed with respect to each other and are so located that they will coincide with the wrist pin Q when the piston occupies a position at or near bottom center and are normally sealed by plates V which may be secured to the cylinder by means of bolts W.

Lubricant splashed from the crank case E is utilized to lubricate the wrist pin. Such lubricant is collected in troughs Y and Z in the bosses B' and connecting rod J respectively. Apertures b are provided in the bosses B' and connecting rod J communicating with the troughs and with apertures c in the bushings O and P in order that the lubricant thus collected my reach the pin Q.

To the end that the piston B may be conveniently withdrawn from the cylinder A after the wrist pin Q has been removed, said piston is provided with threaded apertures X for engagement with suitable devices, such as a threaded rod or bolt (not shown) whereby the piston may be lifted from the cylinder.

In practice, whenever it is desired to remove the piston B from the cylinder A the head C may first be removed. Thereafter, upon removal of one or both of the plates V, one of the spring rings S may be removed from its groove and the wrist pin may then be extracted to disconnect the piston from the connecting rod J. After the piston has been disconnected from the rod J it may be lifted from the cylinder by means of rods or bolts threaded into the apertures X.

The foregoing described invention has been found to be highly desirable in machines of this type since it eliminates the necessity of disconnecting the rod from the crank shaft. This is desirable as it not only assures the continuity of a suitable connection between the connecting rod and the crank shaft but also eliminates the necessity of removing cumbersome and unwieldy parts of an engine in order to gain access to the piston.

I claim:

1. In an engine and the like, the combination of a cylindrical chamber and a reciprocating member therein, said chamber having openings in its side wall, a connecting rod, a bushing in the rod and projecting from opposite sides thereof, annular bosses on the reciprocating member extending transversely thereof, bushings in the bosses having heads thereon abutting the projecting ends of the first bushing, a wrist pin extending through the bushings in the rod and reciprocating member, said wrist pin being accessible through the openings in the chamber wall, means in the headed bushings forming abutments for the ends of the wrist pin, and plates normally closing said openings.

2. In an engine and the like, the combination of a cylindrical chamber and a reciprocating member therein, said chamber having openings in its side walls, a connecting rod, a bushing in the rod and projecting from opposite sides thereof, annular bosses on the reciprocating member extending transversely thereof, bushings in the bosses having heads thereon abutting the projecting ends of the first bushing, a wrist pin extending through the bushings in the rod and reciprocating member, said wrist pin being accessible through the openings in the chamber wall, lubricant troughs in the bosses and the connecting rod having outlets therein, apertures in the bushings of the connecting rod and reciprocating member to convey lubricant from the outlets to the wrist pin, spring rings in the headed bushings forming abutments for the ends of the wrist pin, and plates normally closing said openings.

In testimony whereof I have signed this specification.

FREDERICK W. PARSONS, Sr.